US012554092B2

(12) United States Patent
Hwang et al.

(10) Patent No.: US 12,554,092 B2
(45) Date of Patent: Feb. 17, 2026

(54) CAMERA MODULE FOR VEHICLE

(71) Applicant: LG INNOTEK CO., LTD., Seoul (KR)

(72) Inventors: Deok Ki Hwang, Seoul (KR); Jun Young Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 341 days.

(21) Appl. No.: 18/023,563

(22) PCT Filed: Aug. 24, 2021

(86) PCT No.: PCT/KR2021/011245
§ 371 (c)(1),
(2) Date: Feb. 27, 2023

(87) PCT Pub. No.: WO2022/045715
PCT Pub. Date: Mar. 3, 2022

(65) Prior Publication Data
US 2023/0314752 A1 Oct. 5, 2023

(30) Foreign Application Priority Data
Aug. 26, 2020 (KR) .................. 10-2020-0108039

(51) Int. Cl.
G02B 7/02 (2021.01)
H04N 23/55 (2023.01)
H04N 23/57 (2023.01)

(52) U.S. Cl.
CPC ............. *G02B 7/021* (2013.01); *H04N 23/55* (2023.01); *H04N 23/57* (2023.01)

(58) Field of Classification Search
CPC .......... G02B 7/02; G02B 7/021; G02B 7/022; G02B 7/023; G02B 7/025; G02B 7/026; G02B 7/027; G02B 7/028; H04N 23/57; H04N 23/55
See application file for complete search history.

(56) References Cited

U.S. PATENT DOCUMENTS

| | | | |
|---|---|---|---|
| 5,638,478 A | 6/1997 | Iwakura et al. | |
| 2004/0120046 A1 | 6/2004 | Shirie | |
| 2006/0204243 A1 | 9/2006 | Tsai | |
| 2008/0074763 A1* | 3/2008 | Jao | H04N 23/57 359/811 |
| 2010/0027137 A1 | 2/2010 | Noh et al. | |
| 2011/0043932 A1 | 2/2011 | Nomura et al. | |
| 2016/0161702 A1 | 6/2016 | Yang | |
| 2018/0011280 A1 | 1/2018 | Sung | |
| 2018/0217361 A1 | 8/2018 | Yoshioka et al. | |

(Continued)

FOREIGN PATENT DOCUMENTS

| | | |
|---|---|---|
| CN | 1831575 A | 9/2006 |
| CN | 101644813 A | 2/2010 |

(Continued)

*Primary Examiner* — Ephrem Z Mebrahtu
(74) *Attorney, Agent, or Firm* — Birch, Stewart, Kolasch & Birch, LLP

(57) ABSTRACT

The camera module disclosed in the embodiment of the invention includes a lens holder; a plurality of lenses disposed within the lens holder; a spacer disposed between at least one of the plurality of lenses and the lens holder, at least one groove may be disposed on the upper and lower surfaces of the spacer.

20 Claims, 13 Drawing Sheets

(56) References Cited

U.S. PATENT DOCUMENTS

| | | | |
|---|---|---|---|
| 2018/0246258 A1 | 8/2018 | Shiraiwa et al. | |
| 2018/0372984 A1 | 12/2018 | Shirotori | |
| 2023/0244055 A1* | 8/2023 | Wang | G02B 1/041 |
| | | | 348/148 |

FOREIGN PATENT DOCUMENTS

| | | |
|---|---|---|
| CN | 105676401 A | 6/2016 |
| JP | 11-149029 A | 6/1999 |
| JP | 2008-304642 A | 12/2008 |
| JP | 2010-122557 A | 6/2010 |
| JP | 2011-48123 A | 3/2011 |
| JP | 2014-41167 A | 3/2014 |
| JP | 2017-223901 A | 12/2017 |
| JP | 2019-8201 A | 1/2019 |
| JP | 2019-148660 A | 9/2019 |
| KR | 10-2010-0101675 A | 9/2010 |
| KR | 10-2012-0050352 A | 5/2012 |
| KR | 10-2016-0068508 A | 6/2016 |
| KR | 10-2018-0033131 A | 4/2018 |
| KR | 10-2018-0034343 A | 4/2018 |
| TW | 200807049 A | 2/2008 |

\* cited by examiner

CAMERA MODULE FOR VEHICLE

CROSS REFERENCE TO RELATED APPLICATIONS

This application is the National Phase of PCT International Application No. PCT/KR2021/011245, filed on Aug. 24, 2021, which claims priority under 35 U.S.C. § 119 (a) to Patent Application No. 10-2020-0108039, filed in Republic of Korea on Aug. 26, 2020 all of which are hereby expressly incorporated by reference into the present application.

TECHNICAL FIELD

An embodiment of the invention relates to a camera module for a vehicle.

BACKGROUND ART

ADAS (Advanced Driving Assistance System) is an advanced driver assistance system for assisting the driver in driving, and consists of sensing the situation ahead, determining the situation based on the sensed result, and controlling the vehicle behavior based on the situation judgment. For example, an ADAS sensor device detects a vehicle ahead and recognizes a lane. Then, when the target lane, target speed, and forward target are determined, the vehicle's Electrical Stability Control (ESC), EMS (Engine Management System), and MDPS (Motor Driven Power Steering) are controlled. Typically, ADAS may be implemented as an automatic parking system, a low-speed city driving assistance system, a blind spot warning system, and the like. Sensor devices for sensing the situation ahead in ADAS include a GPS sensor, laser scanner, front radar, lidar, etc. The most representative is a front camera for capturing the front of the vehicle.

In recent years, research on a sensing system for sensing the surroundings of a vehicle for driver's safety and convenience has been accelerated. The vehicle detection system is used for various purposes, such as detecting objects around the vehicle to prevent collisions with objects not recognized by the driver, and automatically parking by detecting empty spaces, and provides the most essential data for automatic vehicle control. As such a detection system, a method using a radar signal and a method using a camera are commonly used. A camera module for a vehicle is used by being built into a front and rear surveillance camera and a dashboard camera in an automobile, and takes a picture or video of a subject. Since the vehicle camera module is exposed to the outside, photographing quality may deteriorate due to humidity and temperature. In particular, the camera module has a problem in that optical characteristics are changed depending on the ambient temperature and the material of the lens.

DISCLOSURE

Technical Problem

An embodiment of the invention may provide a camera module having a spacer having a buffer structure outside the lens. The spacer may provide a buffer structure having one or more grooves. An embodiment of the invention may provide a camera module including a spacer having a buffer structure between at least one of a plurality of lenses and the lens holder.

An embodiment of the invention may provide a camera module including a lens or/and a spacer having at least one groove or buffer structure on upper and lower surfaces. An embodiment of the invention may provide a camera module having a spacer having grooves on the upper and lower portions to alleviate contraction and expansion of the lens.

Technical Solution

A camera module according to an embodiment of the invention comprises a lens holder; a plurality of lenses disposed within the lens holder; a spacer disposed between at least one of the plurality of lenses and the lens holder, wherein at least one groove is disposed on the upper and lower surfaces of the spacer.

According to an embodiment of the invention, the plurality of lenses may include first to fourth lenses, the spacer may be disposed between the second lens and the fourth lens, and the third lens may be disposed inside the spacer. According to an embodiment of the invention, the upper surface of the spacer may contact the second lens, and the lower surface of the spacer may contact the fourth lens. According to an embodiment of the invention, a side cross section of the groove may have a triangular shape. Both side surfaces of the groove may have inclined surfaces having different angles.

According to an embodiment of the invention, the spacer includes a first groove disposed on the upper surface and a second groove disposed on the lower surface, and a shortest distance between a low point of the first groove and a low point of the second groove may be greater than or equal to a height of a side surface of the at least one lens. The shortest distance may be a shortest distance between a virtual straight line contacting to the low point of the groove perpendicular to the optical axis on the upper surface and a virtual straight line contacting to the low point of the groove perpendicular to the optical axis on the lower surface.

According to an embodiment of the invention, the spacer may include a first portion disposed between the second lens and the lens holder, and a second portion disposed between the fourth lens and the lens holder. According to an embodiment of the invention, a plurality of grooves disposed on each of the upper and lower surfaces are arranged in a direction perpendicular to the optical axis, and a distance between the virtual lines connecting the low points of the grooves disposed on the upper surface and the low points of the grooves disposed on the upper surface may be greater than or equal to a height of a side surface of the at least one lens.

A camera module according to an embodiment of the invention includes a lens holder; first to fourth lenses sequentially arranged in the lens holder from the object side to the image side; and a spacer disposed between at least one of the second to fourth lenses and the lens holder, wherein the spacer includes a plurality of grooves, the one lens includes an effective diameter region and a flange region, the flange region is supported by the spacer, and a center of an outermost surface of the flange region may not overlap with the grooves in a first direction perpendicular to the optical axis.

According to an embodiment of the invention, at least one of the upper or lower edge of the outermost surface may be disposed on the same straight line as the lower point of the groove. A gap may be formed between at least one of the first to fourth lenses and the lens holder. The first lens may include a glass material, and at least one of the second to fourth lenses may be made of a plastic material.

Advantageous Effects

According to an embodiment of the invention, a buffer structure may be formed in a spacer disposed outside a lens to suppress a change in optical characteristics due to expansion and contraction of the lens in a first direction orthogonal to an optical axis. In addition, embodiments of the invention may alleviate deformation of the lens due to a difference in coefficient of thermal expansion between the lens and the lens holder by using the buffer structure of the spacer. In addition, according to embodiments of the invention, thermal deformation of the lens may be compensated for by disposing a buffer structure in the spacer disposed outside the lens having relatively large thermal deformation.

In an embodiment of the invention, a buffer structure may be disposed in a spacer disposed between adjacent lenses to suppress bending of lenses. In addition, according to embodiments of the invention, deformation due to expansion of the lens may be suppressed by arranging grooves in an upper portion and a lower portion of the spacer outside the lens. Also, permanent deformation of the lens may be prevented.

According to an embodiment of the invention, optical reliability of a camera module having a lens and a spacer having a buffer structure may be improved. In addition, the reliability of the camera module and the vehicle camera device having the same may be improved.

BEST MODE

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology.

Further, the terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element. In addition, several embodiments described below can be combined with each other unless specifically stated that they cannot be combined with each other. In addition, unless otherwise specified, descriptions for other embodiments may be applied to missing parts in the description of any one of several embodiments.

Embodiment

Figure 1:
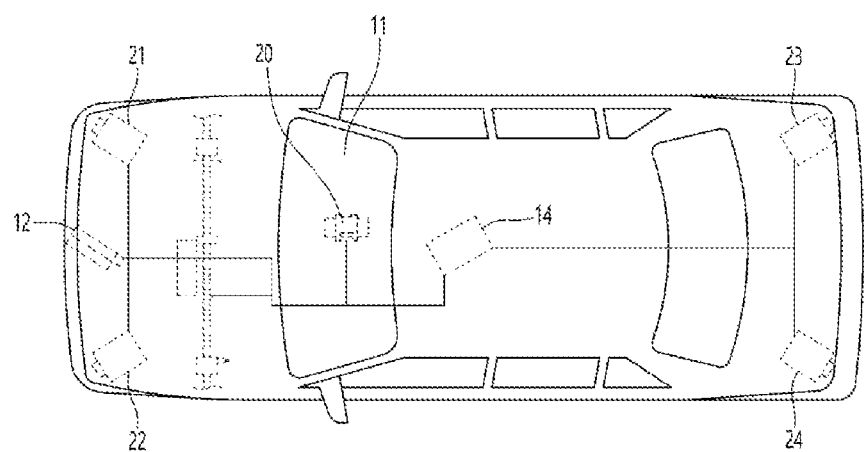
FIG. 1 is an example of a plan view of a vehicle to which a camera module according to an embodiment of the invention is applied.

FIG. 1 is an example of a plan view of a vehicle to which a camera module according to an embodiment of the invention is applied.

Referring to FIG. 1, a camera system for a vehicle according to an embodiment of the invention includes an image generating portion 11, a first information generating portion 12, a second information generating portion 21, 22, 23, and 24 and a control portion 14. The image generating portion 11 may include at least one camera module 20 disposed in the vehicle, and captures the front side of the vehicle and/or the driver to generate a front image of the vehicle or an image inside the vehicle. In addition, the image generating portion 11 may generate an image of the surroundings of the own vehicle by capturing not only the front of the own vehicle but also the surroundings of the own vehicle in one or more directions using the camera module 20.

Here, the front image and the surrounding image may be digital images, and may include color images, black and white images, and infrared images. In addition, the front image and the surrounding image may include still images and moving images. The image generating portion 11 provides the driver's image, front image, and surrounding image to the control portion 14. Subsequently, the first information generating portion 12 may include at least one radar or/and camera disposed in the own vehicle, and detects the front side of the own vehicle to generate first detection information. Specifically, the first information generating portion 12 is disposed in the own vehicle and generates first detection information by detecting the location and speed of vehicles located in front of the own vehicle, presence and location of pedestrians, and the like. Using the first detection information generated by the first information generating portion 12, control may be performed to maintain a constant distance between the host vehicle and the preceding vehicle, and it is possible to increase the stability of vehicle operation in a predetermined specific case, such as when the driver wants to change the driving lane of the vehicle or when parking in reverse. The first information generating portion 12 provides the first sensing information to the control portion 14. The second information generating portions 21, 22, 23, and 24 detect each side of the host vehicle based on the front image generated from the image generating portion 11 and the first detection information generated from the first information generating portion 12 to generate second sensing information. Specifically, the second information generating portions 21, 22, 23, and 24 may include at least one radar or/and camera disposed in the host vehicle, and may include locations of vehicles located on the side of the host vehicle, and may be sensed speed and captured an image. Here, the second information generating portions 21, 22, 23, and 24 may be disposed at both front corners, side mirrors, and rear center and rear corners of the vehicle, respectively.

The vehicle camera system may include a camera module described in the following embodiment, and may protect vehicles and objects from autonomous driving or surrounding safety by providing or processing information acquired through driver monitoring, the front, rear, side, or corner regions of the own vehicle to the user. An optical system of the camera module according to an embodiment of the invention may be mounted in a vehicle in order to enhance safety regulation, self-driving function, and convenience. In addition, the optical system of the camera module is applied to a vehicle as a component for controlling a lane keeping assistance system (LKAS), a lane departure warning system (LDWS), and a driver monitoring system (DMS). Such a camera module for a vehicle may realize stable optical performance even when the ambient temperature changes and provides a module with a competitive price, thereby securing reliability of vehicle components.

In the description of the invention, the first lens means the lens closest to the object side, and the last lens means the lens closest to the image side (or a surface of sensor). The last lens may include a lens adjacent to the image sensor. Unless otherwise specified in the description of the invention, all units for the radius, thickness/distance, TTL, etc. of the lens are mm. In this specification, the shape of the lens is shown based on the optical axis of the lens. For example, a fact that the object side of the lens is convex or concave means that the vicinity of the optical axis is convex or concave on the side of the object of the lens, and that the periphery of the optical axis is not convex or concave. Therefore, even when it is described that the object side of the lens is convex, the portion around the optical axis on the object side of the lens may be concave or vice versa. In this specification, it is noted that the thickness and radius of curvature of the lens are measured based on the optical axis of the lens. That is, the convex surface of the lens means that the surface of the lens in the region corresponding to the optical axis has a convex shape, and the concave surface of the lens means that the surface of the lens in the region corresponding to the optical axis has a concave shape. Also, the "object-side surface" may refer to a surface of a lens facing the object side based on an optical axis, and the "image-side surface" may refer to a surface of a lens facing an imaging surface based on an optical axis.

Figure 2:
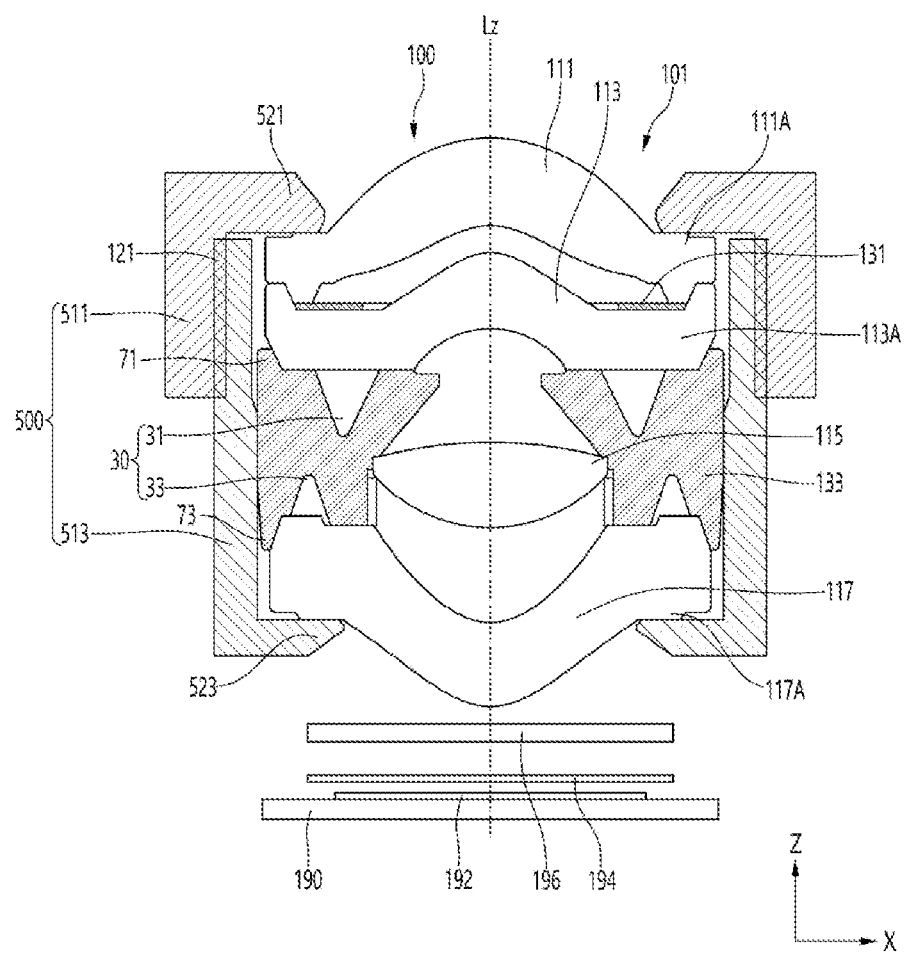
FIG. 2 is a side cross-sectional view showing an example of a camera module according to an embodiment of the invention.
Figure 3:
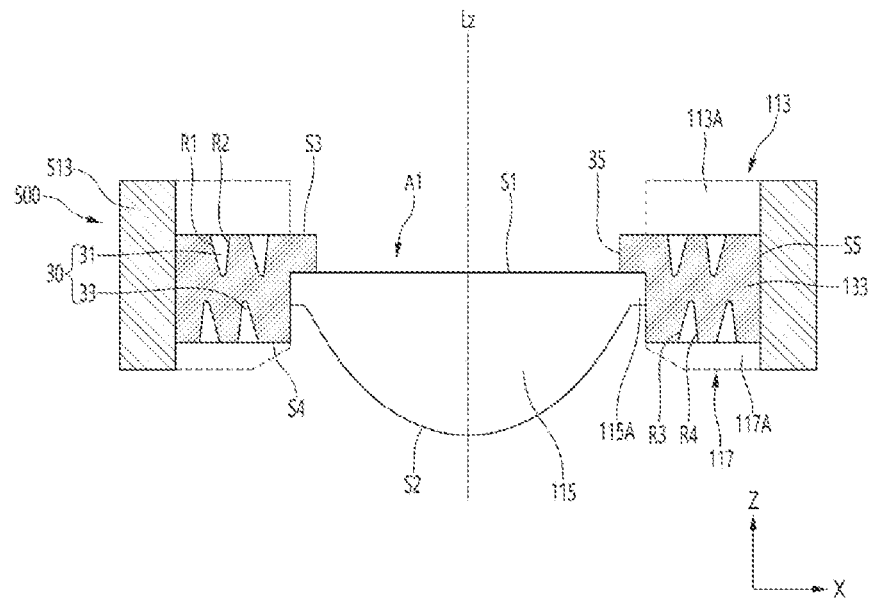
FIG. 3 is a first example of a side cross-sectional view of a spacer having a buffer structure in the camera module of FIG. 2.
Figure 4:
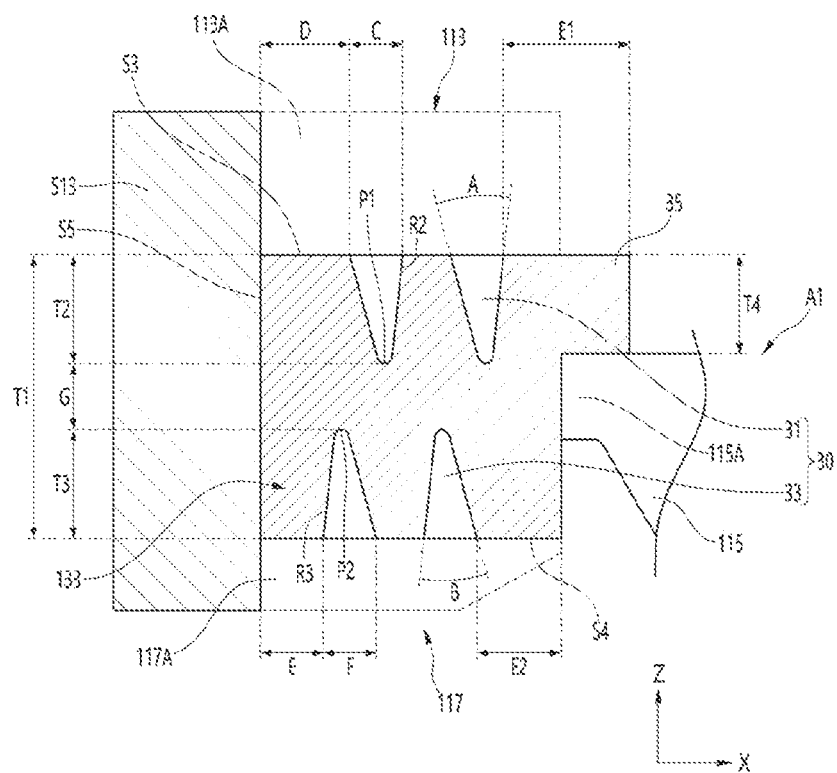
FIG. 4 is a detailed view of the spacer of FIG. 3.
Figure 5:
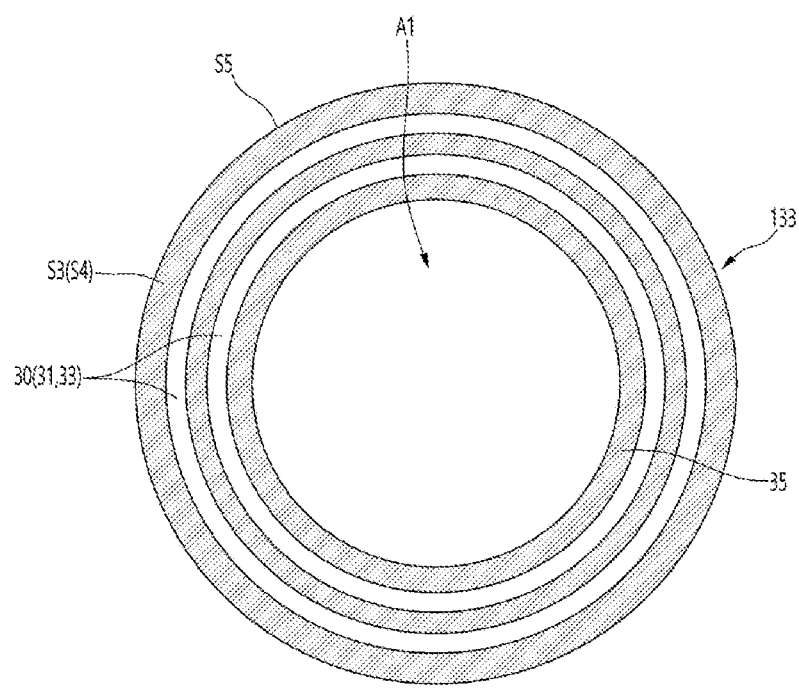
FIG. 5 is an example of a plan view of the spacer of FIG. 3.

FIG. 2 is a side cross-sectional view showing an example of a camera module according to an embodiment of the invention, FIG. 3 is a first example of a side cross-sectional view of a spacer having a buffer structure in the camera module of FIG. 2, FIG. 4 is a detailed view of the spacer of FIG. 3, and FIG. 5 is an example of a plan view of the spacer of FIG. 3.

Referring to FIGS. 2 to 5, the camera module 1000 according to an embodiment of the invention includes a housing 500, a lens portion 100 having a plurality of lenses 111, 113, 115, and 117, spacers 131 and 133, a main board 190 and an image sensor 192. The camera module 1000 may include a cover glass 194 and an optical filter 196 between the lens portion 100 and the image sensor 192.

In the lens portion 100, at least three or more lenses 111, 113, 115, and 117 may be stacked, for example, three to seven or three to five lenses may be stacked. The lens portion 100 may include at least three or more solid lenses, and the solid lens may include at least one plastic lens. In the lens portion 100 according to an embodiment of the invention, one or more lenses made of plastic may be included. For convenience of description, in the lens portion 100, a first lens 111, a second lens 113, a third lens 115, and a fourth lens 117 stacked toward the image sensor 192 from the object side may be aligned along the optical axis Lz.

The first lens 111 is a lens closest to the subject, and at least one or both of an upper surface through which light is incident and a lower surface through which light exits may be spherical or aspheric. An upper or lower surface of the first lens 111 may be concave or convex. The first lens 111 may be made of a plastic material when the camera module 1000 is exposed to light from the inside or outside of the vehicle to prevent discoloration, and may be made of glass or plastic material when the camera module 1000 is placed inside the vehicle. The second lens 113 may be made of glass or plastic. The second lens 113 is disposed between the first lens 111 and the third lens 115, and may have a flange portion 113A on the outside. The third lens 115 may be made of glass or plastic. The fourth lens 117 is a lens closest to the image sensor 192 and may be made of glass or plastic. The upper and/or lower surfaces of the second lens 113, the third lens 115, and the fourth lens 117 may be spherical or aspheric, but are not limited thereto.

The lenses 111, 113, 115, and 117 of the lens portion 100 may be coupled in the lens holder 513 of the housing 500 from the upper portion to the sensor side, coupled in the opposite direction, or coupled in both directions. A gasket 121 may be included between the cover 511 and the lens holder 513, and the gasket 121 may be a waterproof ring.

The housing 500 includes a cover 511 and a lens holder 513, and may have an opening 101 penetrating from a upper portion to a lower portion. The cover 511 and the lens holder 513 may be integrally formed, or may be separated from or combined with each other. The cover 511 may be a cover coupled to the outer periphery of the lens holder 513 from the upper portion thereof, and an inner protrusion 521 of the cover 511 may support the circumference of the first lens 111, and an inner protrusion 523 of the lens holder 513 may be disposed under the flange portion 117A of the fourth lens 117.

Each of the lenses 111, 113, 115, and 117 may include an effective region having an effective diameter through which light is incident, and flange portions 111A, 113A, 115A, and 117A that are non-effective regions outside the effective region. The non-effective region may be a region in which light is blocked by the spacers 131 and 133. The flange portions 111A, 113A, 115A, and 117A may extend in a circumferential direction with respect to the optical axis Lz in effective regions of the lenses 111, 113, 115, and 117. At least one 115 of the lenses 111, 113, 115, and 117 may have no flange or be provided with a relatively short length.

The lens holder 513 protects and supports the outer surface of the lens portion 100. The lens holder 513 supports outer surfaces of the plurality of lenses 111, 113, 115, and 117. The lens holder 513 may be a lens barrel, and may be provided with one or a plurality of barrels. The top view shape of the housing 500 may include a circular column shape or a polygonal column shape. The housing 500 may be formed of a material such as resin, plastic, or metal. A hydrophilic material may be coated or coated on the surface of the housing 500. Here, the lens holder 513 may be formed of a metal material, for example, it may be selected from Al, Ag, or Cu material, and may be Al or an Al alloy. When the lens holder 513 is made of metal, heat transmitted in the lateral direction of the lenses 111, 113, 115, and 117 may be dissipated, and thermal deformation of the lenses 111, 113, 115, and 117 may be suppressed.

The image sensor 192 may be disposed on the main board 190. The image sensor 192 may be mounted, seated, contacted, fixed, temporarily fixed, supported, or coupled to the main board 190 on a plane crossing the optical axis Lz. Alternatively, according to another embodiment, a groove or hole (not shown) capable of accommodating the image sensor 192, and the embodiment is not limited to a specific form in which the image sensor 192 is disposed on the main board 190. The main board 190 may be a rigid PCB or an FPCB.

The image sensor 192 may perform a function of converting light passing through the lens portion 100 into image data. A sensor holder may be disposed under the housing 500 to surround the image sensor 192 and protect the image sensor 192 from external foreign substances or shocks. The image sensor 192 may be any one of a charge coupled device (CCD), complementary metal-oxide semiconductor (CMOS), CPD, and CID. When the number of image sensors 192 is plural, one may be a color (RGB) sensor and the other may be a black and white sensor.

The optical filter 196 may be disposed between the lens portion 100 and the image sensor 192. The optical filter 196 may filter light corresponding to a specific wavelength range with respect to light passing through the lenses 111, 113, 115, and 117. The optical filter 196 may be an infrared (IR) blocking filter that blocks infrared rays or an ultraviolet (UV) blocking filter that blocks ultraviolet rays, but the embodiment is not limited thereto. The optical filter 196 may be disposed on the image sensor 192. The cover glass 194 is disposed between the optical filter 196 and the image sensor 192, protects the upper portion of the image sensor 192, and may prevent the reliability of the image sensor 192 from deteriorating. The camera module 1000 according to an embodiment of the invention may include a driving member (not shown), and the driving member may move or tilt the lens barrel having at least one of lenses in direction of the optical axis or/and a direction orthogonal to the optical axis direction. The camera module may include an auto focus (AF) function and/or an optical image stabilizer (OIS) function.

Here, the lens portion 100 may be stacked with plastic lenses or glass lenses, or mixed with each other. Here, the plastic material may be 5 times higher than the coefficient of thermal expansion (CTE) of the glass material, and the change value (dN/dT) of the refractive index as a function of temperature may be 10 times lower than the glass material. Here, dN is the change value of the refractive index of the lens, and dT represents the change value of the temperature.

Figure 13:
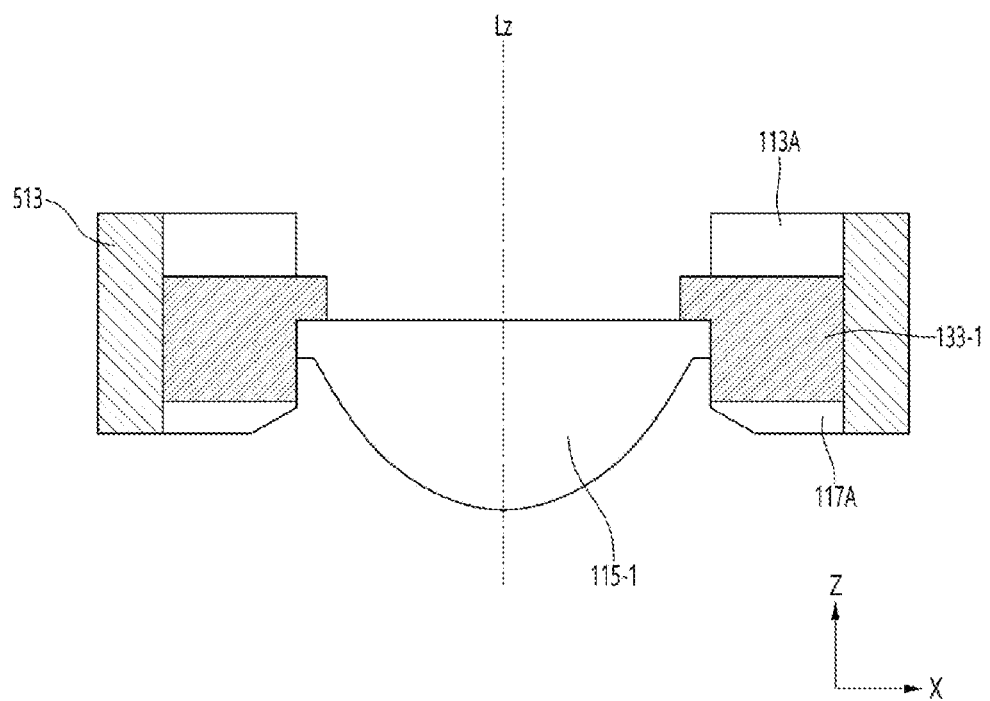
FIG. 13 is an example of a spacer without a buffer structure as a comparative example.

When a plastic lens is used for the camera module 1000 in a vehicle, the price may be lowered compared to a lens made of glass, and light path control may be facilitated by providing aspheric surfaces on an incident side surface and an exit side surface. In addition, a lens made of glass or plastic may expand or contract due to a difference in thermal expansion coefficient from that of the lens holder 513. As a result, the lens may be deformed in the optical axis direction when the expansion is not relieved in the longitudinal direction, and a problem in that the optical characteristics of the lens may be changed may occur. Therefore, when there is no buffer structure outside the effective region of the lens to alleviate the expansion of the lens, the heights of the incident-side surface and the exit-side surface of the lens may be different, and the optical characteristics of the lens may be affected. That is, as shown in FIG. 13, since the spacer 133-1 without a buffer structure is disposed outside the lens 115-1, expansion of the lens 115-1 in the longitudinal direction cannot be alleviated, and the lens 115-1 has a problem in that deformation occurs in the direction of the optical axis Lz.

According to an embodiment of the invention, a member or means having a buffer structure is disposed between at least one effective diameter region among the plurality of lenses 111, 113, 115, and 117 and the lens holder 513 to suppress a change in optical characteristics of the effective diameter region. The member or means may be a flange portion disposed outside the effective diameter region of the lens or/and a spacer disposed between the lens and the lens holder. An embodiment of the invention will be described as an example in which a buffer structure is provided to at least one of the spacers 131 and 133. The spacer 133 having the buffer structure 30 may suppress a change in optical characteristics of the third lens 115 disposed therein. The spacers 131 and 133 may block light leaked or introduced to the outside, and a distance between two adjacent lenses may be adjusted. The spacers 131 and 133 may be defined as a light blocking film. Here, the spacer 133 having the buffer structure 30 may function as an aperture stop. A surface of the spacer 133 having the buffer structure 30 may be coated with a light blocking material to block light. Here, a gap may be included between at least one of the plurality of lenses 111, 113, 115, and 117 and the lens holder 513. For example, as shown in FIG. 5, the spacers 131 and 133 may have an opening portion A1 therein. The spacers 131 and 133 may include a first spacer 131 disposed around the outer periphery of the first lens 111 and the second lens 113, and a second spacer 133 disposed around the outer periphery of the second lens 131 and the fourth lens 117. The second spacer 133 may support the flange portion 11A of the third lens 115 at an inner periphery thereof.

The second spacer 133 having the buffer structure 30 is disposed between the second lens 113 and the fourth lens 117, may be spaced apart from the third lens 113 and the fourth lens 117, and may support the outside of the third lens 115. A region between the outside of the third lens 115 and the second spacer 133 may be adhered with an adhesive. Here, the second spacer 133 having the buffer structure 30 is illustrated as an example disposed outside the third lens 113, but may be disposed outside the first lens 111, the second lens 113, or/and the fourth lens 117. The buffer structure 30 may include a structure having grooves 31 and 33 at upper and lower portions. The grooves 31 and 33 may be formed in a continuous ring shape.

The second spacer 133 having the buffer structure 30 may be formed of a material having a higher thermal expansion coefficient than a glass material or a material having a higher thermal expansion coefficient than a metal material. The spacer 133 having the buffer structure 30 may be formed of a plastic material, for example, a thermoplastic or thermosetting material.

The first spacer 131 and the second spacer 133 may be made of the same material or different materials, for example, they may be made of a material that absorbs light. The first and/or second spacers 131 and 133 may include a poly ethylene film (PE) film or a polyester (PET) film. As another example, the first or/and second spacers 131 and 133 may have a metal or alloy and an oxide film formed on their surface. A material included in the metal or alloy may include at least one of In, Ga, Zn, Sn, Al, Ca, Sr, Ba, W, U, Ni, Cu, Hg, Pb, Bi, Si, Ta, H, Fe, Co, Cr, Mn, Be, B, Mg, Nb, Mo, Cd, Sn, Zr, Sc, Ti, V, Eu, Gd, Er, Lu, Yb, Ru, Y, and La. The oxide film may be an oxide material treated with black oxide or brown oxide using copper.

The third lens 115 disposed inside the second spacer 133 having the buffer structure 30 may be made of glass or plastic. A thickness of the second spacer 133 may be greater than a height of an outer surface of the third lens 115. The thickness of the second spacer 133 may be greater than a thickness of a central portion of the third lens 115. An upper surface of the second spacer 133 may contact the second lens 113. A lower surface of the second spacer 133 may contact the fourth lens 117. The second spacer 133 includes a first portion 71 disposed between the flange portion 113A of the second lens 113 and the lens holder 513, and a second portion 73 disposed between the flange portion 117A of the fourth lens 117 and the lens holder 513. The second spacer 133 may protect the outside of the third lens 115 and the outsides of the second lens 113 and the fourth lens 117.

Hereinafter, an example in which the buffer structure 30 is provided on the second spacer 133 outside the third lens 115 will be described, the buffer structure 30 may buffer the length of the third lens 115 when the length of the third lens 115 expands according to the ambient temperature. The buffer structure 30 may provide elasticity in a direction orthogonal to the optical axis Lz in the second spacer 133 or in a circumferential direction.

Figure 6:
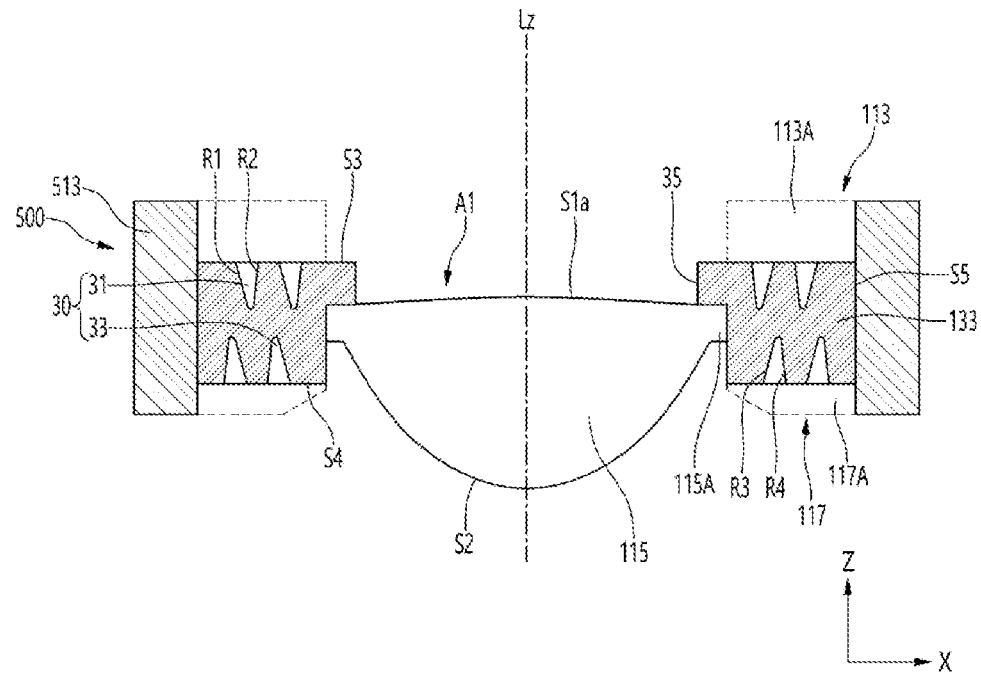
FIGS. 6 and 7 are other examples of the lens of FIG. 3.
Figure 7:
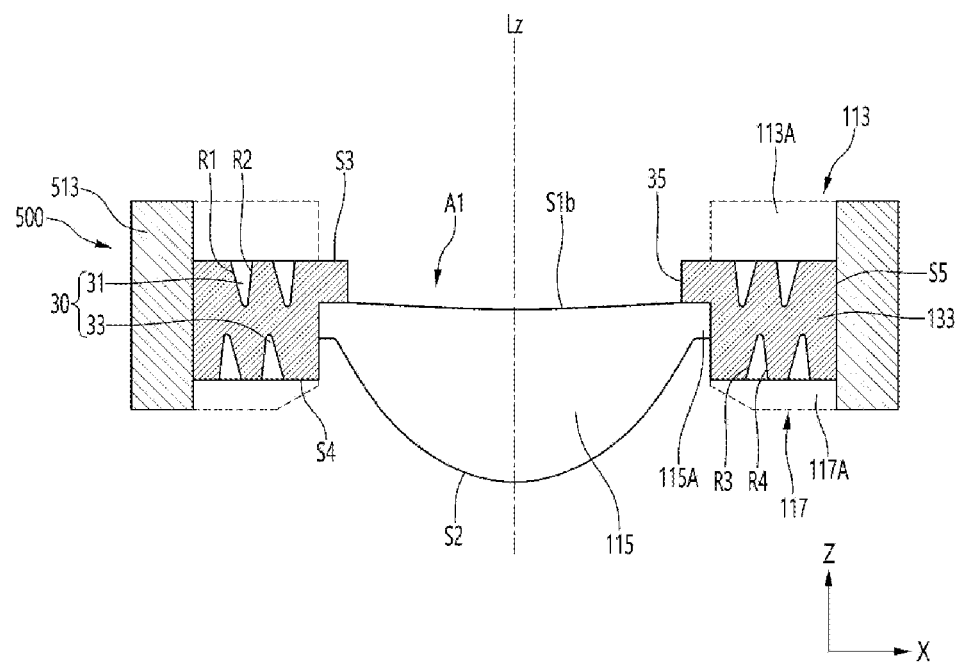

The second spacer 133 having the buffer structure 30 and the lens 115 will be described with reference to FIGS. 3 to 5. Referring to FIGS. 3 to 5, the lens 115 may include an object-side first surface S1 and an upper-side second surface S2 of an effective region having an effective diameter through which light travels. The flange portion 115A of the lens 115 may extend outward from the first surface S1 and the second surface S2 and may include an upper edge and a lower edge. The first surface S1 may be convex toward the object side, flat, or concave toward the image side (or sensor side). For example, as shown in FIG. 6, the first surface S1a of the lens 115 may be convex, or as shown in FIG. 7, the first surface S1b of the lens 115 may be concave. The second surface S2 of the lens 115 may be convex toward the image side, and as another example, may be concave toward the object side or flat. The concave, flat, or convex structures of the first and second surfaces S1 and S2 of the lens 115 may be changed according to lens characteristics and camera types.

The spacer 133 may include an opening portion A1 therein, an object-side third surface S3, and an upper fourth surface S4. The third surface S3 may include a horizontal plane or an inclined surface, and may include a protrusion protruding toward the object side, as shown in FIG. 2. The fourth surface S4 may include a horizontal plane or an inclined surface, and as shown in FIG. 2, a portion of the fourth surface S4 may protrude upward or downward. The spacer 133 may include one or a plurality of buffer structures 30. The buffer structure 30 may include a first groove 31 concave from the third surface S3 toward the fourth surface S4 and a second groove 33 concave from the fourth surface S4 toward the third surface S3. The first groove 31 and the second groove 33 may be alternately arranged on different planes based on the optical axis Lz. The buffer structure 30 having the first groove 31 and the second groove 33 may prevent a decrease in rigidity of the spacer 133 and may contract or expand according to thermal deformation of the lens 113 and 117.

As shown in FIGS. 3 and 5, one or a plurality of first grooves 31 may be disposed in the third surface S3. When viewed from a top view, the first groove 31 may have a continuous circular shape or a ring shape. The plurality of first grooves 31 may be formed in a circular or ring shape, and the plurality of first grooves 31 may be arranged in concentric circles having different radii. The plurality of first grooves 31 may overlap in a direction orthogonal to the optical axis Lz. One or a plurality of second grooves 33 may be disposed on the fourth surface S4. When viewed from the bottom view, the second groove 33 may have a continuous circular shape or a ring shape. The plurality of second grooves 33 may be formed in a circular or ring shape, and the plurality of second grooves 33 may be arranged in concentric circles having different radii. The plurality of second grooves 33 may overlap in a direction orthogonal to the optical axis Lz. Side cross sections of the first groove 31 and/or the second groove 33 may have a triangular shape. The triangular shape may be a shape in which two points contacting the upper or lower surface and the deepest point are connected. The portion where the deepest point is disposed may be an angular surface, a curved surface, or a flat surface. The first groove 31 may have a triangular shape with a wide upper portion and a narrow lower portion, and the second groove 33 may have a triangular shape with a wide lower portion and a narrow upper portion, that is, an inverted triangle shape.

An embodiment of the invention provides a buffer structure 30 having at least two grooves 31 and 33 on the spacer 133 outside the lens 115 to alleviate the thermal expansion of the lens 113 with elasticity and suppress a change in direction of the Z-axis (optical axis) direction of the lens 113.

As shown in FIG. 4, at least one of the third and fourth surfaces S3 and S4 of the spacer 133 may include an extension portion 35 overlapping the lens 115 in a vertical direction. For example, the extension portion 35 is disposed outside the effective diameter region of the lens 115 so that the flange portion 115A may be seated thereon. The flange portion 115A is attached with an adhesive on the extension portion 35 and may support the lens 115. The third surface S3 of the spacer 133 may be disposed higher than the first surface S1 of the lens 115. The fourth surface S4 of the spacer 133 may be disposed lower or higher than the second surface S2 of the lens 115. The plurality of first grooves 31 may be spaced apart from each other, and may have the same or different depths T2. When the depths T2 of the plurality of first grooves 31 are different from each other, a region adjacent to the upper first edge of the flange portion 115A of the lens 135, that is, the depth of the groove adjacent to the inner surface of the spacer 133 is the deepest, and the depth of the groove adjacent to the outer surface S5 of the spacer 133 may be disposed to be the lowest. Conversely, when the depths T2 of the plurality of first grooves 31 are different from each other, the groove depth adjacent to the upper first edge of the flange portion 115A of the lens 115 is the lowest, and the depth of the groove adjacent to the outer surface S5 may be the deepest. When the depths T2 of the first grooves 31 are provided differently, the change in expansion of the first grooves 31 in the circumferential direction from the center of the lens 113 can be gradually suppressed. An upper first edge of the flange portion 115A of the lens 135 may be an end seated on the extension portion 35 of the spacer 133.

The flange region of the lens 115 is supported by the spacer 133, and the center of the outermost surface of the flange region may not be overlapped with each of the grooves 31 and 33 in a first direction perpendicular to the optical axis Lz. At least one of the upper and lower edges of the outermost surface of the lens 115 may be on the same line as the lowest point of each groove 31 and 33. The depth T2 of the first groove 31 may be 40% or less of the thickness T1 of the spacer 133, 20% or more of the thickness T1 of the spacer 133, or in a range of 30% to 40% of the thickness T1 of the spacer 133. When the depth T2 of the first groove 31 is larger than the above range, it is difficult to form a spacer, and when it is smaller than the above range, the buffer function against lens expansion may deteriorate. A distance between adjacent first grooves 31 may be smaller than a depth T2 of the first grooves 31. When the distance between the first grooves 31 is greater than the depth T2, the buffer function in the first direction X orthogonal to the optical axis Lz may deteriorate, and the degree of deformation of the lens 113 in a direction of the optical axis Lz may be increased. Therefore, expansion relaxation in the first direction X may be maximized by the depth T2 and intervals of the first grooves 31.

The plurality of second grooves 33 may be spaced apart from each other and may have the same or different depths T3. When the depths T3 of the plurality of second grooves 33 are different from each other, the region adjacent to the lower edge of the effective diameter region of the lens 113, that is, the groove depth adjacent to the inner surface of the spacer 133 is the deepest, and the depth of the groove adjacent to the outer surface S5 of the spacer 133 may be disposed to be the lowest. Conversely, when the depths T3 of the plurality of second grooves 33 are different from each other, a depth of the groove adjacent to the lower edge of the flange portion 115A of the lens 115 is the lowest, and a depth of the groove adjacent to the outer surface S5 of the spacer 133 may be placed the deepest. When the depths T3 of the second grooves 33 are provided differently, a change in expansion of the second grooves 33 in the circumferential direction from the center of the lens 117 may be gradually suppressed. The lower edge of the lens 115 may be positioned higher than the fourth surface S4 of the spacer 133. The depth T2 of the second groove 33 may be 40% or less of the thickness T1 of the spacer 133, 20% or more of the thickness T1 of the spacer 133, or in a range of 20% to 40% of the thickness T1 of the spacer 133. when the depth T3 of the second groove 33 is larger than the above range, it is difficult to form a spacer, and when it is smaller than the above range, the buffer function against lens expansion may deteriorate. A distance between adjacent second grooves 33 may be smaller than a depth T3 of the second grooves 33. When the distance between the second grooves 33 is greater than the depth T3, the buffer function in the horizontal direction may deteriorate, and the degree of deformation of the lens 117 in the optical axis direction may increase. Therefore, expansion relaxation in the horizontal direction may be maximized by the depth T3 and spacing of the second grooves 33.

In the spacer 133, a plurality of first grooves 31 are arranged in the circumferential direction on the third surface S3, and a plurality of second grooves 33 are arranged on the fourth surface S4 in the circumferential direction. A virtual straight line passing through the deepest low point P1 in the first grooves 31 and a virtual straight line passing through the deepest low point P2 in the second grooves 33 in the direction Z parallel to the optical axis may be arranged to be shifted from each other. For example, the virtual straight lines respectively passing through the low points P1 of the first grooves 31 in a direction Z parallel to the optical axis Lz may be arranged alternately with the virtual straight lines respectively passing through the low points P2 of the second grooves 33 in a direction Z parallel to the optical axis Lz. Virtual straight lines passing through the points P1 and P2 of the two different grooves 31 and 33 may be parallel to the optical axis Lz.

The shortest distance G between the virtual straight line connecting the low points P1 of the first grooves 31 in the first direction X orthogonal to the optical axis Lz and a virtual straight line connecting the low points P2 of the second groove 33 in the first direction X orthogonal to the optical axis Lz may be 30% or less, in a range of 10% to 30%, or in a range of 20% to 30% of the thickness T1 of the spacer 133. The shortest distance G between the virtual straight line connecting the low points P1 of the first grooves 31 in the first direction X orthogonal to the optical axis Lz and the virtual straight line connecting the low points P2 of the second grooves 33 in the first direction X orthogonal to the optical axis Lz may be greater than or equal to the side height of the lens 115. When the spacer 133 is injected, the shortest distance G may be an interval at which the efficiency of injecting the liquid material by the first and second grooves 31 and 33 is not lowered. The shortest distance G may be 0.2 mm or more, 0.2 mm to 0.7 mm, or 0.25 mm to 0.65 mm.

In the spacer 133, a distance between the virtual straight lines connecting the low points P1 and P2 of the respective grooves 31 and 33 opposite to each other may be greater than or equal to the height of the side surface of the lens 115. In addition, the low point P1 of the first grooves 31 and the low point P2 of the second groove 33 may not overlap the side surface of the lens 115 in the first direction X. Since the low point P1 of the first groove 31 and the low point P2 of the second groove 33 do not overlap and are spaced apart in the first direction X, the low point P1 of the first groove 31 and the low point P2 of the second groove 33 may not overlap in a side surface of the lens 115 or the flange portion 115A in a first direction X orthogonal to the optical axis Lz. Accordingly, the impact in the first direction X outward from the flange portion 115A of the lens 115 is transmitted to the lens holder 513 through the spacer 133, and the impact of the diagonal direction deformed in the first direction X may be absorbed by the first groove 31 and the second groove 33.

In the buffer structure 30 of the spacer 133, the first groove 31 may include a first outer surface R1 close to the outer surface S5 of the spacer 133 based on the low point P1, and a first inner surface R2 facing the first outer surface R1. The inner angle A of the first groove 31 may be 20 degrees or more, for example, in the range of 20 degrees to 50 degrees or in the range of 20 degrees to 40 degrees. Each of the first outer surface R1 and the first inner surface R2 may be inclined based on an axis parallel to the optical axis, and may be inclined at the same angle or different angles. An inclination angle of the first outer surface R1 may be equal to or greater than an inclination angle of the first inner surface R2. For example, the inclination angle of the first outer surface R1 may be 20 degrees or more, for example, 20 degrees to 40 degrees or 20 degrees to 30 degrees. The inclination angle of the first inner surface R2 may be less than 20 degrees, for example, in the range of 3 degrees to 18 degrees or in the range of 3 degrees to 10 degrees. The difference of the inclination angles between the first outer surface R1 and the first inner surface R2 may be in the range of 10 degrees to 30 degrees. Accordingly, the first grooves 31 may effectively alleviate the expansion of the upper portion of the lens by the inner angle A.

In the buffer structure 30 of the spacer 133, the second groove 33 may include a second outer surface R3 close to the outer surface of the spacer 133 based on the low point P2, and a second inner surface R4 facing the second outer surface R3. The inner angle B of the second groove 33 may be 20 degrees or more, for example, in the range of 20 degrees to 50 degrees or in the range of 20 degrees to 40 degrees. Each of the second outer surface R3 and the second inner surface R4 may be inclined based on an axis parallel to the optical axis, and may be inclined at the same angle or different angles. An inclination angle of the second outer surface R3 may be equal to or smaller than an inclination angle of the second inner surface R4. For example, the inclination angle of the second outer surface R3 may be less than 20 degrees, for example, in the range of 3 degrees to 18 degrees or in the range of 3 degrees to 10 degrees. The inclination angle of the second inner surface R4 may be 20 degrees or more, for example, 20 degrees to 40 degrees or 30 degrees to 40 degrees. The difference of the inclination angles between the second outer surface R3 and the second inner surface R4 may be in the range of 10 degrees to 30 degrees. Accordingly, the second grooves 33 may effectively alleviate the expansion of the lower portion of the lens by the inner angle B.

Accordingly, since the buffer structure 30 is provided in the spacer 133 in the invention, it is possible to provide elasticity against expansion or contraction of the lens 115 in the lateral direction. Accordingly, the expansion transmitted to the spacer 133 may be alleviated to suppress the effective diameter region of the lens 115 from being deformed in the optical axis direction, which may minimize the change in the optical characteristics (MTF: Modulation transfer function) of the lens 113.

The minimum distance E1 between the first grooves 31 adjacent to the upper inner edge of the spacer 133 may be greater than the maximum width of the first grooves 31. The minimum distance E1 may be greater than the distance D between the outer surface S5 of the spacer 133 and the first groove 31 closest thereto. Accordingly, when the first grooves 31 are buffered with respect to the expansion of the lens in the circumferential direction within the lens 113, the first grooves 31 and the lens holder 513 supporting the outer surface S5 of the spacer 133 may support the outer surface S5 of the spacer 133, and it is possible to enhance the relaxation effect. The minimum distance E2 between the second grooves 33 adjacent to the lower inner edge of the spacer 133 may be greater than the maximum width of the second grooves 33, and a distance E between the outer surface S5 of the spacer 133 and the second groove 33 closest thereto. Accordingly, when the second grooves 33 are buffered with respect to the expansion of the lens in the circumferential direction within the lens, the second grooves 33 and the lens holder 513 supporting the outer surface S5 of the spacer 133 may support the side surface of the spacer 133 in the lens holder 513, and it is possible to further enhance the relaxation effect.

Meanwhile, in the embodiment of the invention, the flange portions 113A and 117A of the second and fourth lenses 113 and 117 are disposed on the upper portion of the third surface S3 and the lower portion of the fourth surface S4 of the spacer 133 and may face them. That is, the flange portion 113A of the second lens 113 adheres to the upper portion of the spacer 133 and may cover the first grooves 31. The lower surface of the flange portion 113A has an area larger than the area of the upper surface of the first grooves 31, and may be adhered to the third surface S3 of the spacer 133. The flange portion 117A of the fourth lens 117 adheres to the upper portion of the spacer 133 and may cover the second grooves 33. The lower surface of the flange portion 117A has an area larger than that of the lower surfaces of the second grooves 33, and may be adhered to the fourth surface S4 of the spacer 133. These flange portions 113A and 117A may suppress the flow of the spacer 133 in the optical axis direction at the upper portion and lower portion of the spacer 133, so that the elasticity in the first direction perpendicular to the optical axis may be more effectively guided.

When the lens 115 expands in the longitudinal direction or the circumferential direction, the contraction of the spacer 133 and deformation of the spacer 133 and the lens 115 in the optical axis direction may be prevented due to the elasticity of the first grooves 31 and the second grooves 33. In an embodiment of the invention, the first surface S1 of the lens 113 is convex or flat and the second surface S2 is convex or concave, or the first surface S1 is convex and the second surface S2 is convex. In the spacer 133, the first groove 31 may be disposed closer to the effective diameter region of the lens 115 than the second groove 33.

Figure 8:
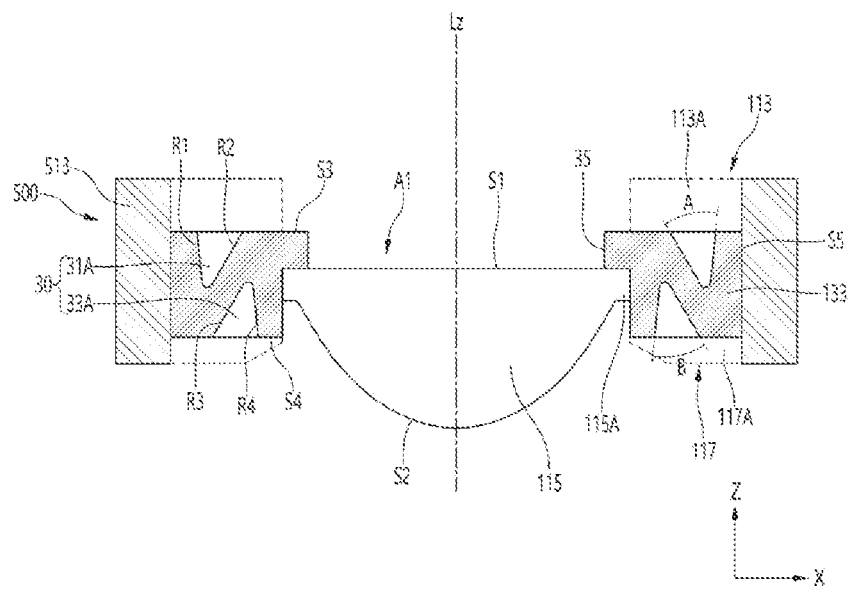
FIG. 8 is a second example of a buffer structure of a spacer in the camera module of FIG. 2.
Figure 9:
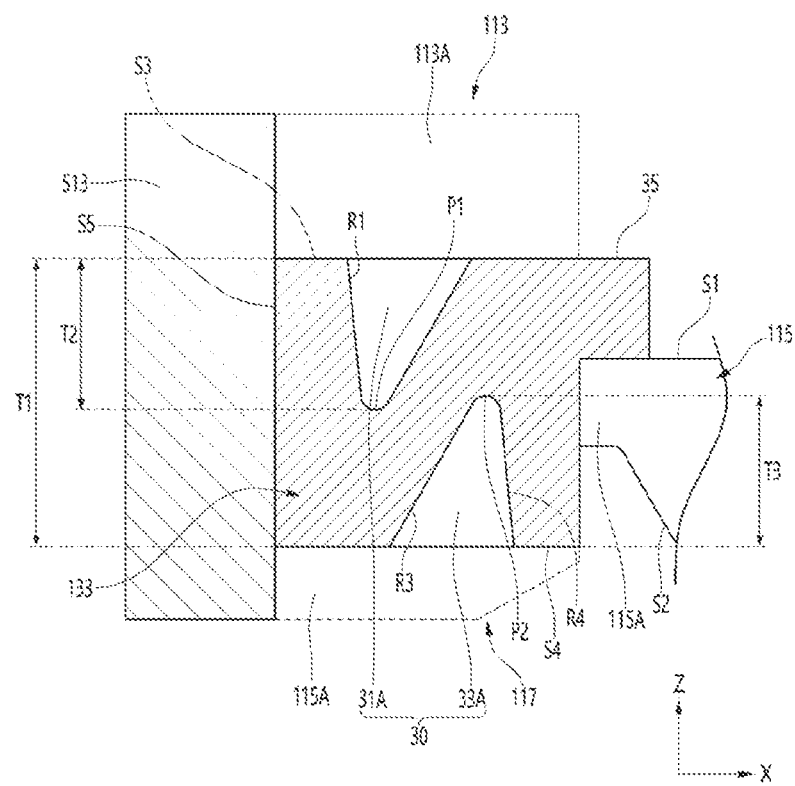
FIG. 9 is a detailed view of the spacer of FIG. 5.

FIGS. 8 and 9 are other examples of the spacer of FIG. 3. Referring to FIGS. 8 and 9, the spacer 133 may include a buffer structure 30 having a first groove 31A on the third surface S3 and a second groove 33A on the fourth surface S4. The buffer structure 30 may be arranged in the order of the first groove 31A and the second groove 33A with respect to the optical axis Lz. In the buffer structure 30, the depth of the first groove 31A and the depth of the second groove 33A may be the same or different from each other. The depth of the first groove 31A may be 40% or more of the thickness of the spacer 133, for example, in a range of 40% to 60% or in a range of 40% to 50%. The depth of the second groove 33A may be 40% or more of the thickness T1 of the spacer 133, for example, in a range of 40% to 60% or in a range of 40% to 50%.

The inner angle A of the first groove 31A may be 25 degrees or more, for example, in the range of 25 degrees to 60 degrees or in the range of 30 degrees to 50 degrees. Each of the first outer surface R1 and the first inner surface R2 may be inclined based on an axis parallel to the optical axis, and may be inclined at the same angle or different angles. An inclination angle of the first outer surface R1 may be equal to or smaller than an inclination angle of the first inner surface R2. For example, the inclination angle of the first outer surface R1 may be less than 20 degrees, for example, in the range of 3 degrees to 18 degrees or in the range of 3 degrees to 10 degrees. The inclination angle of the first inner surface R2 may be 25 degrees or more, for example, in the range of 25 degrees to 40 degrees or in the range of 25 degrees to 35 degrees. The difference of the inclination angles between the first outer surface R1 and the first inner surface R2 may be in the range of 15 degrees to 30 degrees. Accordingly, the first groove 31A may effectively alleviate the expansion of the upper portion of the lens by the inner angle B. The inner angle B of the second groove 33A may be 25 degrees or more, for example, in a range of 25 degrees to 60 degrees or in a range of 30 degrees to 50 degrees. Each of the second outer surface R3 and the second inner surface R4 may be inclined based on an axis parallel to the optical axis, and may be inclined at the same angle or different angles. An inclination angle of the second outer surface R3 may be equal to or smaller than an inclination angle of the second inner surface R4. For example, the inclination angle of the second outer surface R3 may be 25 degrees or more, for example, in a range of 25 degrees to in a range of 40 degrees or 25 degrees to 35 degrees. The inclination angle of the second inner surface R4 may be less than 20 degrees, for example, in the range of 3 degrees to 18 degrees or in the range of 3 degrees to 10 degrees. The difference of the inclination angles between the second outer surface R3 and the second inner surface R4 may be in the range of 15 degrees to 30 degrees. Accordingly, the second groove 33A may effectively alleviate the expansion in the lower portion of the lens by the inner angle B. A virtual straight line passing through the low point(s) of the first groove 31A and a virtual straight line passing through the low point(s) of the second groove 33A may overlap in a first direction X orthogonal to the optical axis Lz and the overlapping region may overlap the side surface of the lens 115 or/and the flange portion 115A in the first direction X. In this case, since the depth of the first groove 31A and the second groove 33A is deep, the number and depth of the two grooves may be adjusted within the above range by considering the impact in the first direction X or diagonal direction transmitted from the lens 115. The number of the first grooves 31A and the second grooves 33A may be equal to or less than two.

Figure 10:
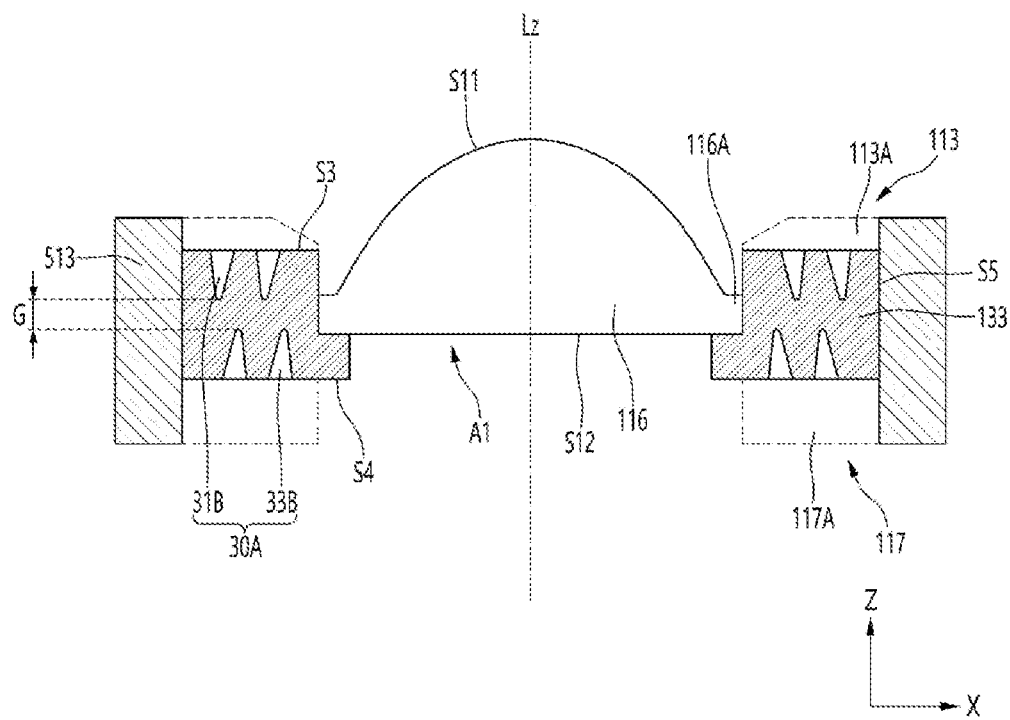
FIG. 10 is another example of a lens and buffer structure in a camera module according to an embodiment of the invention.
Figure 11:
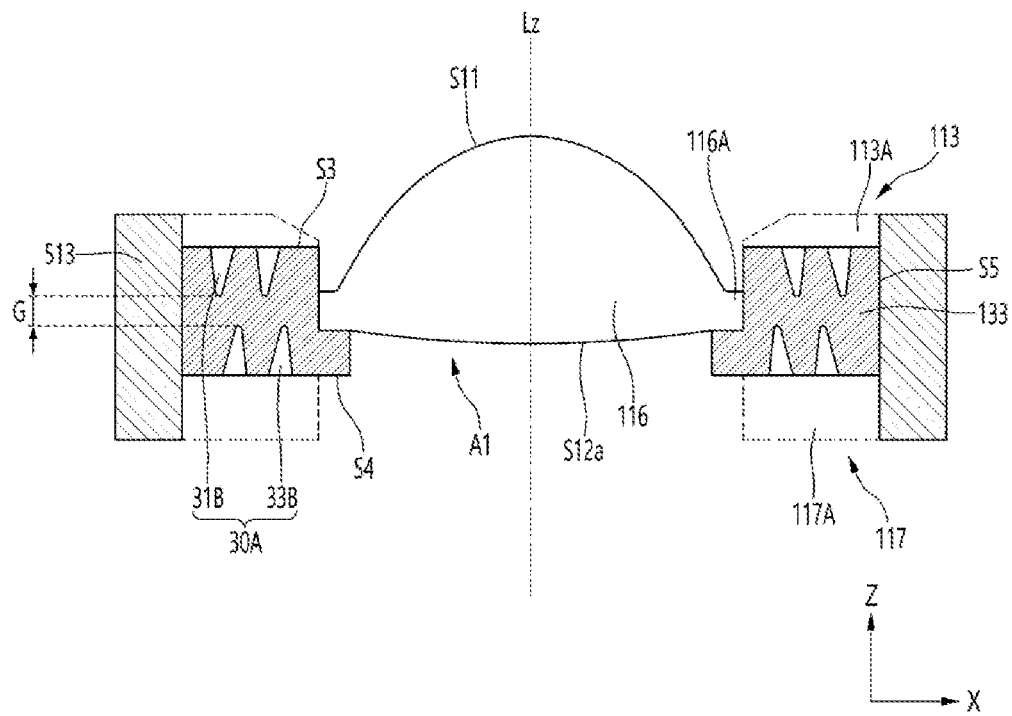
FIG. 11 is another example of the lens of FIG. 10.
Figure 12:
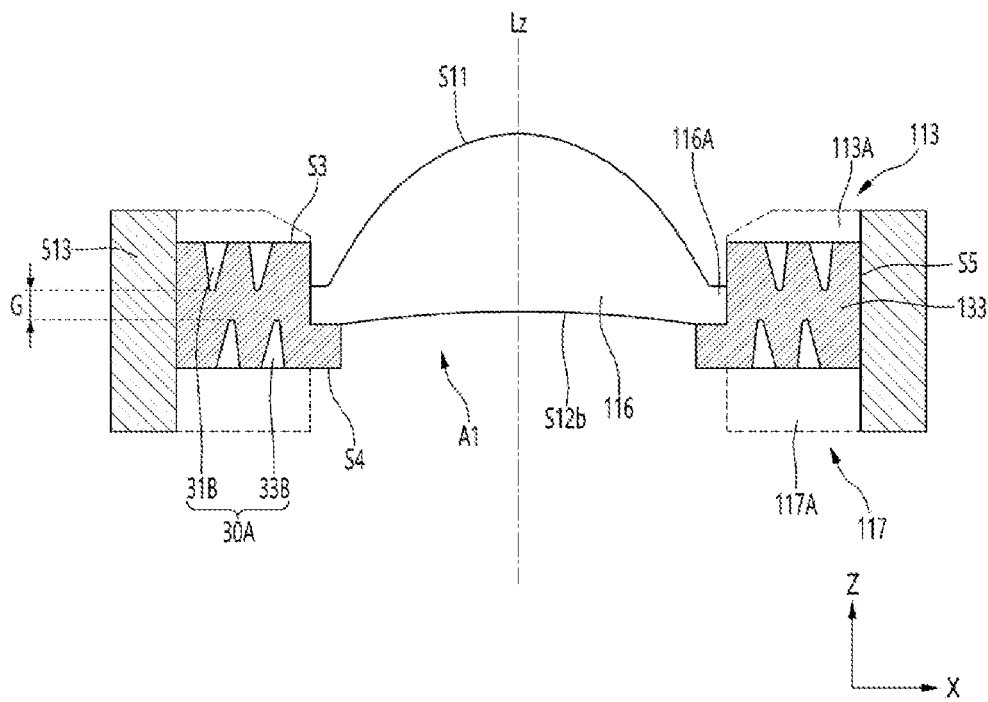
FIG. 12 is another example of the lens of FIG. 10.

In the embodiment of the invention of FIG. 10, when the first surface S11 of the lens 116 is convex and the second surface S12 is flat or convex, a buffer structure 30A having first grooves 31B in the third surface S3 of the spacer 133 and second grooves 33B in the fourth surface S4 may be applied. The configuration of the first groove 31B and the second groove 33B will be referred to the description disclosed above. Here, the fourth surface S4 of the lens 116 may overlap the extension of the spacer 133 in the vertical direction. As another example, as shown in FIG. 11, the second surface S12a of the lens 116 may include a surface which an effective diameter region is convex, or as shown in FIG. 12, the second surface S12b of the lens 116 may have a surface which an effective diameter region is concave.

Figure 14:
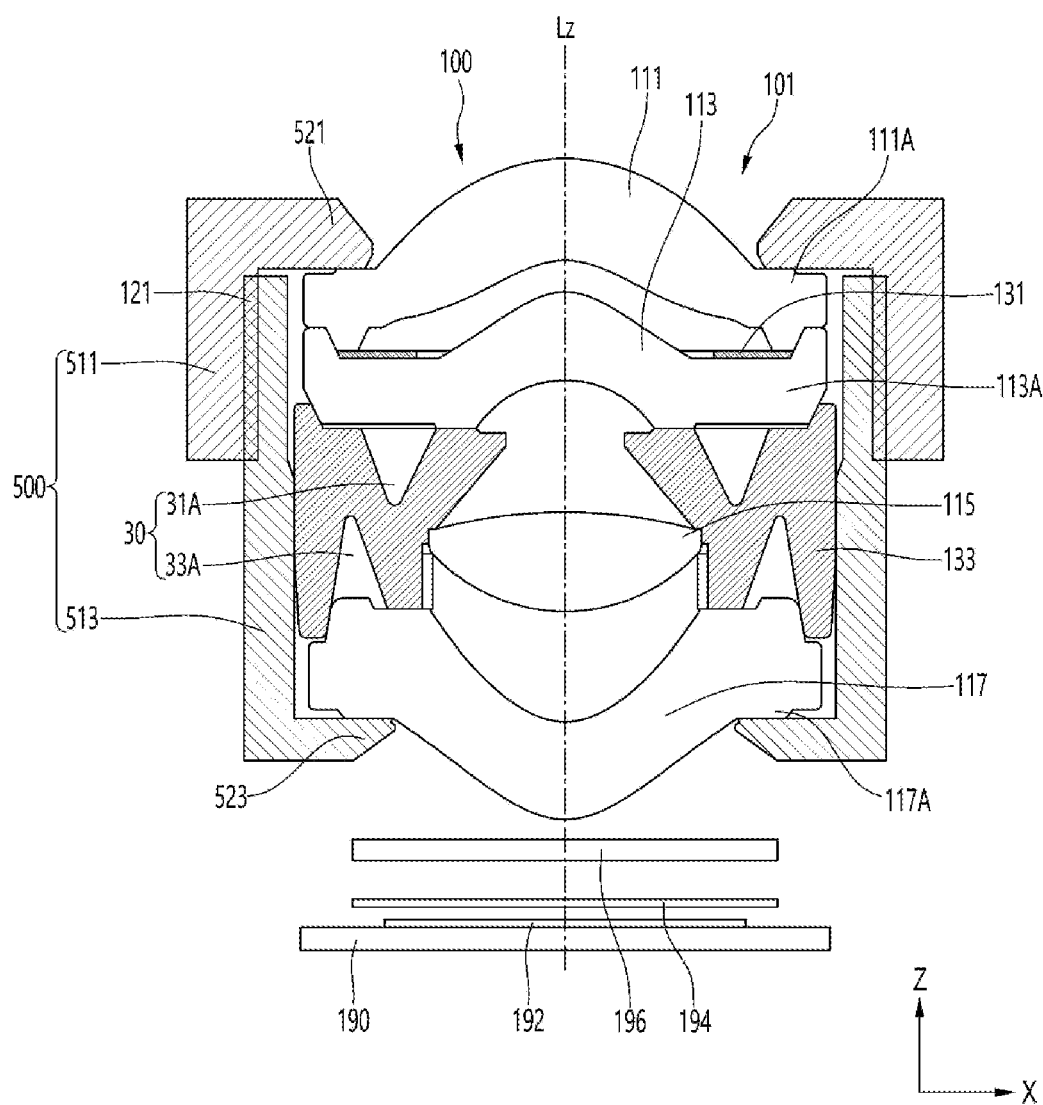
FIG. 14 is an example of a side cross-sectional view of a camera module having the buffer structure of FIG. 9 according to an embodiment of the invention.

FIG. 14 is an example of a side cross-sectional view of a camera module having the spacer structure of FIG. 8.

Referring to FIG. 14, the camera module may include a housing 500, a lens portion 100 having a plurality of lenses 111, 113, 115, and 117, spacers 131 and 133, a main board 190, and an image sensor 192. The camera module 1000 may include a cover glass 194 and an optical filter 196 between the lens portion 100 and the image sensor 192. An embodiment of the invention will be described as an example in which a buffer structure is provided to at least one of the spacers 131 and 133. The spacer 133 having the buffer structure 30 may suppress a change in optical characteristics of the third lens 115 disposed therein. The spacers 131 and 133 may block light leaked or introduced to the outside, and may adjust a distance between two adjacent lenses. The spacers 131 and 133 may be defined as a light blocking film. Here, the spacer 133 having the buffer structure 30 may function as an aperture stop. A surface of the spacer 133 having the buffer structure 30 may be coated with a light blocking material to block light.

The second spacer 133 having the buffer structure 30 is disposed between the second lens 113 and the fourth lens 117 and may space the third lens 113 and the fourth lens 117 apart, and support the outside of the third lens 115. A region between the outside of the third lens 115 and the second spacer 133 may be adhered with an adhesive. Here, although the second spacer 133 having the buffer structure 30 is shown as an example disposed outside the third lens 133, the second spacer 133 having the buffer structure 30 may be disposed outside the first lens 111, the second lens 113, or/and the fourth lens 117. The buffer structure 30 may include a structure having grooves 31 and 33 at upper and lower portions. The grooves 31 and 33 may be formed in a continuous ring shape.

The second spacer 133 having the buffer structure 30 may be formed of a material having a higher thermal expansion coefficient than a glass material or a material having a higher thermal expansion coefficient than a metal material. The spacer 133 having the buffer structure 30 may be formed of a plastic material, for example, a thermoplastic or thermosetting material. The third lens 115 disposed inside the second spacer 133 having the buffer structure 30 may be made of glass or plastic. A thickness of the second spacer 133 may be greater than a height of an outer surface of the third lens 115. A thickness of the second spacer 133 may be greater than a thickness of a central portion of the third lens 115. An upper surface of the second spacer 133 may contact the second lens 113. A lower surface of the second spacer 133 may contact the fourth lens 117. The second spacer 133 includes the first portion 71 disposed between the flange portion 113A of the second lens 113 and the lens holder 513, and a second portion 73 disposed between the flange portion 117A of the fourth lens 117 and the lens holder 513. The second spacer 133 may protect the outside of the third lens 115 and the outsides of the second lens 113 and the fourth lens 117.

The buffer structure 30 of the second spacer 133 may include one or a plurality of first grooves 31A on an upper surface and one or a plurality of second grooves 33A on a lower surface. In the buffer structure 30, a virtual straight line passing through the low point(s) of the first groove 31A and a virtual straight line passing through the low point(s) of the second groove 33A may overlap in a first direction X orthogonal to the optical axis Lz, and the overlapping region may overlap with the side surface of the lens 115 or/and the flange portion 115A in the first direction (X). In this case, since the depth of the first groove 31A and the second groove 33A is deep, the number and depth of the two grooves may be adjusted with the above range by considering the impact in the first direction X or diagonal direction transmitted from the lens 115. The number of the first grooves 31A and the second grooves 33A may be equal to or less than two.

When the length of the third lens 115 according to the ambient temperature expands, the buffer structure 30 may buffer. The buffer structure 30 may provide elasticity in a direction orthogonal to the optical axis Lz or in a circumferential direction in the second spacer 133.

Figure 15:
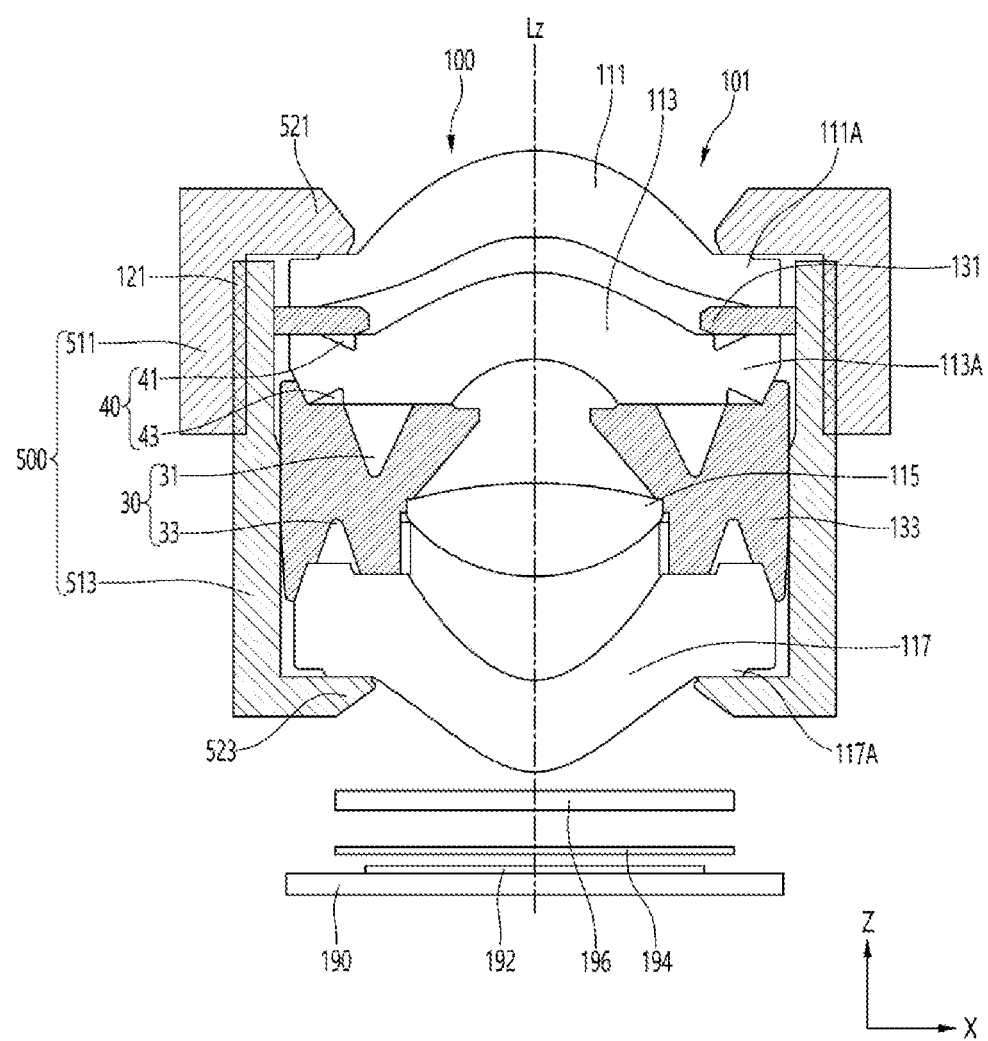
FIG. 15 is an example in which a buffer structure of a spacer and a buffer structure of a lens are applied to a camera module according to an embodiment of the invention.

Referring to FIG. 15, the camera module may define the buffer structure 30 of the spacer 133 as a first buffer structure and the lens buffer structure 40 as a second buffer structure. The lens having the second buffer structure 40 may be disposed on at least one or two or more of the first to fourth lenses. The second buffer structure 40 may be formed as a concave groove on the upper and lower surfaces of the flange portion of the lens.

The first buffer structure 30 of the spacer 133 will be referred to the description of the embodiment disclosed above, and the second buffer structure 40 of the second lens 113 will be described below.

The second lens 113 having the second buffer structure 40 may be disposed between the first lens 111 and the third lens 115. The second buffer structure 40 may contact the first spacer 131. The second buffer structure 40 may contact the second spacer 133. The concave groove 41 on the upper surface of the second buffer structure 40 may face the upper surface of the first spacer 131. The concave groove 43 on the lower surface of the second buffer structure 40 may face the upper surface of the second spacer 133. The upper and lower grooves 41 and 43 of the second buffer structure 40 may overlap the effective diameter region in a first direction X orthogonal to the optical axis Lz. The upper and lower grooves 41 and 43 of the second buffer structure 40 may overlap an outer side surface of the second lens 113 in a first direction X orthogonal to the optical axis Lz.

The second lens 113 to which the second buffer structure 40 is applied may be made of a plastic material. The second buffer structure 40 applied to the second lens 113 made of plastic according to an embodiment of the invention may buffer when the volume of the second lens 113 expands according to the ambient temperature. The second buffer structure 40 may be provided on the flange portion 113A of the second lens 113, and may be provided in a structure that provides elasticity in a direction orthogonal to the optical axis Lz or in a circumferential direction.

Figure 16:
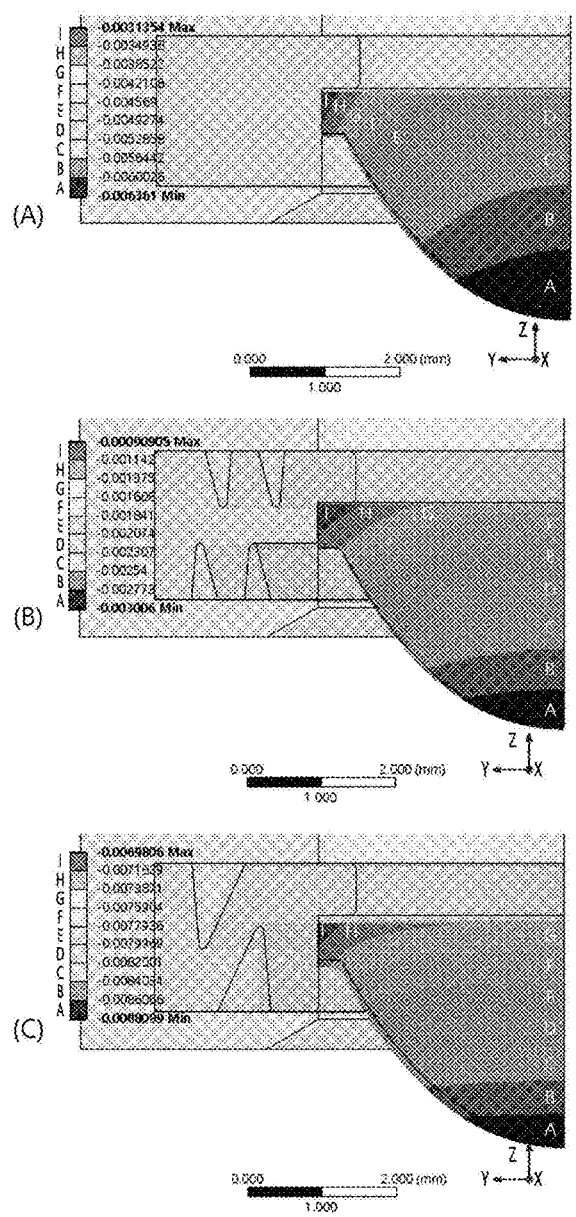
FIG. 16(A)(B)(C) is diagrams showing examples of thermal deformation in lenses of a comparative example and an embodiment.
Figure 17:
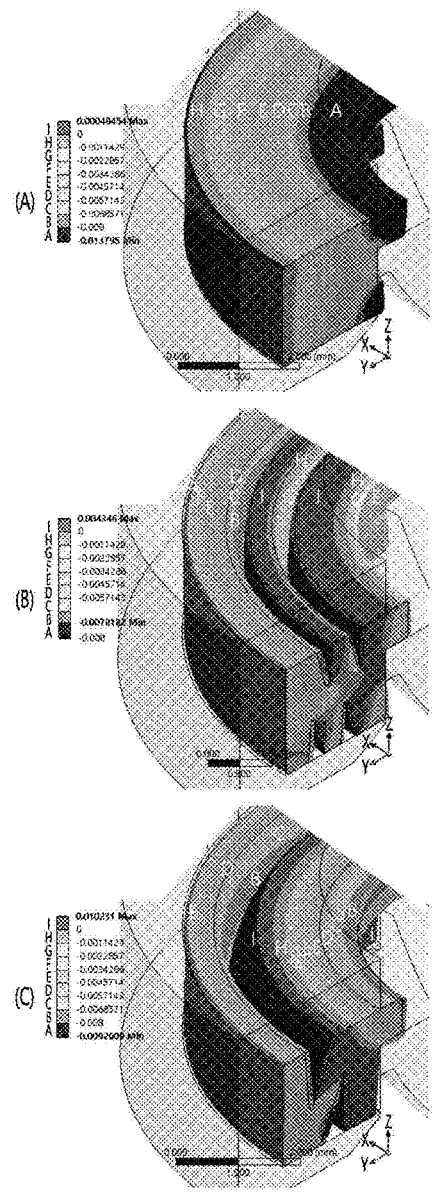
FIG. 17(A)(B)(C) is diagrams illustrating examples of thermal deformation of spacers disposed outside lenses of a comparative examples and an embodiment.

FIG. 16 is a view showing a lens shape change according to whether or not a buffer structure is provided in comparative examples and the embodiment. FIG. 17(A) is a modified example of a lens employing a spacer 133-1 without a buffer structure as shown in FIG. 13, and FIG. 17(B) is a spacer 133 having a buffer structure 30 in the same example as in FIG. 4, and FIG. 17(C) is a modified example of the lens employing the spacer 133 having the buffer structure 30 in the example shown in FIG. 9. Describing the amount of change (unit: mm) in the Z-axis direction in the lens, it may be seen that the structure of comparative example (FIG. 17A) is the largest, and the structure of FIG. 17(B)(C) is smaller than the structure of FIG. 17A. FIG. 17 is a view showing a shape change of a spacer according to whether or not a buffer structure is present in comparative examples and embodiment. FIG. 17(A) is a modified example of the spacer 133-1 without a buffer structure as shown in FIG. 13, and FIG. 17(B) is a modified example of the spacer 133 having a buffer structure 30 as shown in FIG. 4, FIG. 17(C) is a modified example of the spacer 133 having the buffer structure 30 as shown in FIG. 9. Describing the amount of change (unit: mm) in the first direction orthogonal to the optical axis in the spacer, it may be seen that comparative example (FIG. 17A) is the largest and structures of FIG. 17(B)(C) may be smaller than structure of FIG. 17(A). For example, when describing the amount of deformation in the radial direction from the optical axis, FIG. 17(A) structure is 11 μm or more, FIG. 17(B) structure is 10 μm or less, and FIG. 17(C) structure is 4 μm or less.

An embodiment of the invention is to apply the spacer having the buffer structure on the outside of at least one lens for a temperature change from a low temperature of −20 degrees or less to a high temperature of 70 degrees or more, for example, a change in the range of −40 degrees to 85 degrees in a camera module of a vehicle, and since the thermal expansion coefficient is relieved in the longitudinal direction for a lens with a high thermal expansion coefficient, it provides elasticity to contract or expand with respect to the expansion of the lens made of plastic or glass, and may suppress the amount of change in the optical axis direction of the effective diameter region of the lens. Accordingly, it is possible to reduce a change in optical characteristics of a camera module employing a lens made of plastic or glass. In addition, a buffer structure may be further included in the outer flange portion of the lens, so that elastic deformation of the lens itself may be suppressed.

Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In addition, although the embodiment has been described above, it is merely an example and does not limit the invention, and those of ordinary skill in the art will understand that various modifications and applications not exemplified are possible without departing from the essential characteristics of the present embodiment. For example, each component specifically shown in the embodiment can be implemented by modification. And differences related to such modifications and applications should be construed as being included in the scope of the invention defined in the appended claims.

The invention claimed is:

1. A camera module comprising:
a lens holder;
a plurality of lenses disposed within the lens holder and arranged along an optical axis; and
a spacer disposed between at least one of the plurality of lenses and the lens holder,
wherein at least one groove is disposed on upper and lower surfaces of the spacer,
wherein the upper surface of the spacer is an object-side surface adjacent to an object and the lower surface of the spacer is a sensor-side surface opposite to the object-side surface,
wherein the groove includes a first groove concave from the upper surface of the spacer toward the lower surface of the spacer and a second groove concave from the lower surface of the spacer toward the upper surface of the spacer, and
wherein the first groove and the second groove include an inner surface and an outer surface facing each other.

2. The camera module of claim 1, wherein the plurality of lenses includes first to fourth lenses,
wherein the spacer is disposed between the second lens and the fourth lens,
wherein the third lens is disposed inside the spacer.

3. The camera module of claim 2, wherein the upper surface of the spacer contacts the second lens, and the lower surface of the spacer contacts the fourth lens.

4. The camera module of claim 1, wherein a side cross section of the groove has a triangular shape.

5. The camera module of claim 4, wherein the inner surface and the outer surface of the groove have inclined surfaces having different angles with respect to an axis parallel to the optical axis.

6. The camera module of claim 1, wherein a shortest distance between a lowest point of the first groove and a highest point of the second groove is greater than or equal to a height of an outer side surface of the at least one lens.

7. The camera module of to claim 6, wherein the shortest distance is a shortest distance between a virtual straight line connecting to the lowest point of the first groove and a virtual straight line connecting to the highest point of the second groove, and
wherein a minimum distance between a low point of the first groove and the optical axis is different from a minimum distance between a high point of the second groove and the optical axis.

8. The camera module of claim 2, wherein the spacer comprises:
a first portion disposed between the second lens and the lens holder; and
a second portion disposed between the fourth lens and the lens holder.

9. The camera module of claim 1, wherein each of the first groove and the second groove are arranged in a plurality in a direction perpendicular to the optical axis, and a distance between virtual lines connecting low points of the second grooves disposed on the upper surface and low points of the first grooves disposed on the upper surface is greater than or equal to a height of an outer side surface of the at least one lens.

10. The camera module of claim 1, wherein a depth of at least one of the first groove and the second groove is 40% or less of a thickness of the spacer.

11. The camera module of claim 1, wherein at least one of the first groove and the second groove is arranged in a plurality along a first direction orthogonal to the optical axis.

12. The camera module of claim 1, wherein at least one of the first groove and the second groove has an inner angle of 20 degrees or more.

13. The camera module of claim 1, wherein at least one of the first groove and the second groove has the inner surface and the outer surface inclined with respect to an axis parallel to the optical axis, and
wherein an inclination angle between the inner surface and the outer surface is different from each other.

14. A camera module comprising:
a lens holder;
first to fourth lenses sequentially arranged in the lens holder from an object side toward an image side and arranged along an optical axis; and
a spacer disposed between at least one of the second to fourth lenses and the lens holder,
wherein the spacer includes a plurality of grooves,
wherein any one of the first to fourth lenses includes an effective diameter region and a flange region around the effective diameter region,
wherein the flange region is supported by the spacer,
wherein a center of an outermost side surface of the flange region does not overlap with the plurality of grooves in a first direction perpendicular to the optical axis,
wherein the center of the outermost side surface of the flange region is a center between an object-side edge of the outermost side surface of the flange region and an image-side edge of the outermost side surface of the flange region,
wherein at least one of the plurality of grooves includes an inner surface and an outer side surface facing each other, and
wherein two grooves adjacent to the optical axis among the plurality of grooves within the spacer are respectively disposed on opposite surfaces of the spacer facing different lenses.

15. The camera module of claim 14, wherein at least one of upper and lower edges of the outermost side surface of the flange region is on a same straight line in the first direction as a low point of the plurality of grooves.

16. The camera module of claim 14, wherein a gap is formed between at least one of the first to fourth lenses and the lens holder.

17. The camera module of claim 14, wherein the first lens comprises a glass material, and
at least one of the second to fourth lenses is made of plastic material,
wherein deepest points of the two grooves adjacent to the optical axis among the plurality of grooves have different minimum distances from the optical axis, and
wherein the two grooves adjacent to the optical axis among the plurality of grooves are disposed on opposite side surface of the spacer.

18. The camera module of claim 14, wherein the plurality of grooves includes first grooves concave from an upper surface of the spacer toward a lower surface and second grooves concave from the lower surface of the spacer toward the upper surface,
wherein the upper surface of the spacer is an object-side surface adjacent to the object and the lower surface of the spacer is an image-side surface opposite to the object-side surface of the spacer, and
wherein a depth of the first groove is 40% or less of a thickness of the spacer.

19. The camera module of claim 14, wherein the plurality of grooves is concave on at least one of upper and lower surfaces of the spacer and are arranged in the first direction,
wherein the upper surface of the spacer is an object-side surface adjacent to the object and the lower surface of the spacer is an image-side surface opposite to the object-side surface of the spacer, and
wherein at least one of the plurality of grooves has an inner angle of 20 degrees or more.

20. The camera module of claim 14, wherein the inner and outer surfaces of the at least one of the grooves are inclined with respect to an axis parallel to the optical axis, and
wherein an inclination angle between the inner surface and the outer surface is different from each other.

* * * * *